United States Patent
Formisano (10) Patent No.: US 12,108,910 B2
(45) Date of Patent: Oct. 8, 2024

(54) PORTABLE OVEN

(71) Applicant: DELIVITA LIMITED, Huddersfield (GB)

(72) Inventor: Giuseppe Formisano, Huddersfield (GB)

(73) Assignee: DELIVITA LIMITED, Huddersfield (GB)

( * ) Notice: Subject to any disclaimer, the term of this patent is extended or adjusted under 35 U.S.C. 154(b) by 793 days.

(21) Appl. No.: 16/476,467

(22) PCT Filed: Jan. 9, 2018

(86) PCT No.: PCT/GB2018/050051
§ 371 (c)(1),
(2) Date: Jul. 8, 2019

(87) PCT Pub. No.: WO2018/130821
PCT Pub. Date: Jul. 19, 2018

(65) Prior Publication Data
US 2020/0054167 A1 Feb. 20, 2020

(30) Foreign Application Priority Data
Jan. 10, 2017 (GB) ..................................... 1700388

(51) Int. Cl.
*A47J 37/06* (2006.01)
*A47J 37/07* (2006.01)
*F24B 1/02* (2006.01)
*F24B 1/20* (2006.01)

(52) U.S. Cl.
CPC .......... *A47J 37/0658* (2013.01); *F24B 1/022* (2013.01)

(58) Field of Classification Search
USPC ................................................ 126/25, 25 R
See application file for complete search history.

(56) References Cited

U.S. PATENT DOCUMENTS

| 9,016,191 | B2 | 4/2015 | Krolick et al. | |
| 10,932,620 | B2 * | 3/2021 | Ahmed | A47J 37/0763 |
| 2003/0145740 | A1 * | 8/2003 | Stark | A47J 37/0786 |
| | | | | 99/447 |
| 2007/0221191 | A1 | 9/2007 | O'Brien et al. | |

(Continued)

FOREIGN PATENT DOCUMENTS

| BR | 102014024512 A2 * | 4/2016 |
| DE | 2309945 A1 | 9/1974 |

(Continued)

OTHER PUBLICATIONS

손길홍, Kiln type Gas Pizza Oven (Year: 2013).*

(Continued)

*Primary Examiner* — Allen R. B. Schult
*Assistant Examiner* — William C Weinert
(74) *Attorney, Agent, or Firm* — Shumaker, Loop & Kendrick, LLP (57) ABSTRACT

There is described a portable oven, such as a wood-fired oven. The oven comprises a housing and a cooking surface arranged within the housing. The housing comprises a skirt extending below the cooking surface such as to raise the cooking surface from the bottom edge of the oven. There is also provided a method for making a portable oven.

17 Claims, 5 Drawing Sheets

(56) References Cited

U.S. PATENT DOCUMENTS

| | | | |
|---|---|---|---|
| 2008/0164258 A1 | 7/2008 | Raichlen et al. | |
| 2010/0252018 A1* | 10/2010 | Imle | F23M 5/085 |
| | | | 126/19 R |
| 2013/0276643 A1* | 10/2013 | Krolick | F24B 1/003 |
| | | | 99/447 |

FOREIGN PATENT DOCUMENTS

| | | | | |
|---|---|---|---|---|
| DE | 20210476 U1 | 10/2002 | | |
| EP | 0555176 A1 | 8/1993 | | |
| EP | 3033977 A1 | 6/2016 | | |
| FR | 2347622 A1 | 11/1977 | | |
| FR | 2625075 A1 | 6/1989 | | |
| FR | 2883363 A1 | 9/2006 | | |
| JP | 3756388 B2 * | 3/2006 | | |
| JP | 2013078286 A | 5/2013 | | |
| KR | 20130006269 U * | 4/2012 | | |
| KR | 20120136447 A | 12/2012 | | |
| KR | 101676754 B1 | 12/2016 | | |
| WO | WO-2007103524 A2 * | 9/2007 | ......... | A47J 37/0713 |
| WO | 2018130821 A1 | 7/2018 | | |
| WO | 2020223823 A1 | 11/2020 | | |

OTHER PUBLICATIONS

손길홍, Kiln type Gas Pizza Oven (Year: 2013) (Year: 2013).*
International Search Report for PCT/GB2018/050051, Dated Aug. 16, 2018; 8 pages.
EP Patent Office; Office Action cited in EP Application No. 18 700 252.2-1009, Dated Jan. 4, 2021; 5 pages.
Australian Office Action ("AU OA") for AU Pat. App. 2018208069 mailed Jan. 30, 2023 (7 pages).

* cited by examiner

PORTABLE OVEN

CROSS REFERENCE TO RELATED PATENT APPLICATIONS

This application claims the benefit of and priority to International Application No. PCT/GB2018/050051 filed Jan. 9, 2018 which claims priority from GB 1700388.0 filed Jan. 10, 2017.

FIELD

The present invention relates to a portable oven. More specifically, the present invention relates to a portable wood-fired oven.

BACKGROUND

Ovens can be found in many different forms, including electric ovens, gas ovens and wood-fired ovens. Wood-fired ovens can be favoured due to the fast rate of cooking and the distinctive flavour that can be imparted onto the foodstuff.

Wood-fired ovens are commonly permanently fixed ovens formed of a brick enclosure covering a cooking surface to form a partially enclosed cooking chamber having a mouth for insertion of the foodstuff into the chamber. To reach the desired cooking temperature, wood is burnt in the cooking chamber. Once the desired cooking temperature is reached the remaining wood or residues thereof is generally pushed toward the side of the cooking chamber to allow foodstuff to be placed in the chamber. The mixed use of a single surface for heating and cooking means that good heat retention is important to provide a short heating time and a long cooking time. Fixed ovens formed of brick may provide good heat retention but offer little flexibility of location for use and can require substantial space.

Wood-fired ovens formed from materials such as metal as the main structural component can allow for the construction of smaller ovens than brick based ovens but such ovens can still be heavy due to the amount of material required to provide sufficient stability in use. They can also suffer from reduced heat retention, for example due to the conduction of heat away from the cooking chamber, increasing the heating time and reducing the cooking time. Heat conduction may also present a safety risk due to a hot exterior surface, and lead to warping due to repeated heating and cooling. Reducing such risks may require the use of expensive outer protective coverings, further increasing the complexity of the manufacturing process and adding to the weight of the oven.

It is also desirable to use portable ovens on a variety of support surfaces, including surfaces not designed for heat resistance. However, the close contact of a high temperature cooking surface with an untreated surface can result in damage to the surface. Spacing the cooking surface from support surface can reduce heat damage, however spacing the cooking surface can also reduce heat retention.

It is therefore an object of aspects of the present invention to address on or more of the abovementioned or other problems.

BRIEF SUMMARY OF THE INVENTION

According to a first aspect of the present invention there is provided a portable oven, suitably a wood-fired oven, comprising:
a housing;
a cooking surface arranged within the housing;
wherein the housing comprises a skirt extending below the cooking surface such as to raise the cooking surface from the bottom edge of the oven.

Suitably, the housing of the oven of any aspect of the present invention comprises a cover extending over the cooking surface such as to form a partially enclosed cooking chamber with the cooking surface. Preferably, the housing further comprises a base for supporting the cooking surface.

The skirt raises the cooking surface from the support surface on which the oven is placed in use. The support surface may be any suitable surface operable to support the weight of the oven, such as a work top or table.

The skirt of the oven of any aspect of the present invention may extend downwardly from the peripheral edge of the cooking surface. Suitably, the skirt extends around substantially all of the peripheral edge of the cooking surface. Preferably, the skirt is arranged substantially outside of the peripheral edge of the cooking surface.

The skirt of the oven of any aspect of the present invention preferably delineates the side walls of a cavity extending beneath the cooking surface. Preferably, the cavity is free of heat production members in fluid communication with the cooking chamber of the oven. Suitably, the cavity is a substantially open-bottomed cavity.

The oven of any aspect of the present invention may comprise one or more handles for lifting and carrying the oven. Preferably, the handles are integrally formed with the skirt. The skirt may comprise a cut-away portion operable to be used as a handle. Preferably, the cut-away portion is open along at least one side, preferably a lower side of the cut-away portion is open. The skirt may comprise at least two cut-away portions operable to be used as handles. Suitably, the skirt comprises substantially opposed cut-away portions on opposite side of the cooking surface. A lateral axis across the oven joining the opposed cut-away portions may be arranged at a point that is between 30 and 70% along the longitudinal axis of the oven, suitably of the cooking surface, such as between 40 and 60% or between 45 and 55%.

The skirt of the oven of any aspect of the present invention may restrict fluid communication between the external atmosphere and the cavity arranged underneath the cooking surface. For instance, the skirt may restrict the flow of gases from outside of the oven into the cavity. The skirt may enclose the cavity such that substantially all fluid communication with the cavity through a side wall of the oven is prevented.

Suitably, between 30 and 100% of the surface area of the skirt is closed such as to block fluid communication between the external atmosphere and the cavity arranged underneath the cooking surface, such as between 40 and 99%, between 50 and 98%, between 60 and 97%, between 65 and 96%, between 70 and 95%, between 75 and 94% or between 80 and 93%, or between 85 and 92%.

Optionally, only the cut-away portion of the skirt allow fluid communication with the cavity through a side wall of the oven. Suitably, the cut-away portion(s) comprise in total between 2 and 70% of the surface area of the skirt, such as between 3 and 50%, between 4 and 40%, between 5 and 30%, between 6 and 25%, between 7 and 20%, between 7 and 15% or between 7 and 10%.

Advantageously, the oven of the present invention allows for reduced heat damage to the support surface as a result of the raised cooking surface in combination with improved heat retention provided by the skirt due to restricted fluid flow in the area under the cooking surface.

The skirt of the oven of any aspect of the present invention may have a height of up to 30 cm, such as up to 25 cm, 20 cm, or up to 15 cm.

The bottom edge of the skirt of the oven of any aspect of the present invention may at least partially linear, wherein the linear portion of the bottom edge of the skirt is operable to from a close fit abutment with a planar support surface. Preferably, substantially all of the bottom edge of the skirt apart from the cut-away portions is linear.

The cooking surface of the oven of any aspect of the present invention may be formed of a tile, suitably an integrally formed tile or two or more discrete tiles, preferably a single integrally formed tile. The tile may be formed of stone or ceramic, such as refractory ceramic fibres.

The oven of any aspect of the present invention may comprise a mouth in the form of an aperture operable to permit the passage of foodstuffs into and out of the cooking chamber of the oven. The mouth is preferably arranged on a side face of the oven.

The mouth of the oven of any aspect of the present invention may be provided by a mouth plate having an aperture. Suitably, the mouth plate is arranged over the cover. Preferably, the mouth plate is formed of a more heat resistant material than the material of the cover, such as a more heat resistant metal, for example stainless steel. The mouth plate may comprise a layer of insulation between the plate and the cover. Suitably, the side face of the oven comprising the mouth is substantially planar. The lower edge of the mouth may be substantially flush with the upper edge of the cooking surface. Preferably, the mouth is hemispherical.

Suitably, the mouth of the oven of any aspect of the present invention is operable to provide the only means for fluid communication between the cooking chamber and the external atmosphere. As such, preferably the cooking chamber is enclosed apart from the mouth. The cooking chamber may therefore not comprise additional ventilation, such as an upwardly extending chimney, for instance a chimney extending from a top face of the cover.

Advantageously, the limited ventilation of the cooking chamber of the oven of the present invention allows for additionally improved heat retention.

The skirt of the oven of any aspect of the present invention may comprise multiple layers. The skirt may comprise an inner skirt attached to the base and an outer skirt attached to the cover. Preferably, the inner skirt is operable to support the weight of the base and/or the outer skirt is operable to support the weight of the cover.

According to a further aspect of the present invention there is provided a portable oven, suitably a wood-fired oven, comprising:

a housing and a cooking surface;
the housing comprising a cover and a base wherein the cooking surface is attached to the base;
wherein the oven comprises an inner and outer skirt extending below the cooking surface, wherein the base comprises the inner skirt extending below the cooking surface such as to raise the cooking surface from the bottom edge of the oven;
and wherein the cover comprises an outer skirt extending below the cooking surface.

Preferably, the bottom edges of the inner and outer skirt of the oven of any aspect of the present invention are at least partially co-terminal such that each may contact a planar support surface in use, preferably substantially co-terminal. Advantageously, distributing the weight of different components of the oven onto different supporting elements simplifies the manufacture process and reduces the number of weight bearing components. The inner and outer skirts may be attached together, preferably fixedly attached together. Such an attachment advantageously further improves portability.

At least a portion of the inner skirt of the oven of any aspect of the present invention may be integrally formed with the base and/or at least a portion of the outer skirt may be integrally formed with the cover. Suitably, substantially all of the inner skirt is integrally formed with the base and/or substantially all of the outer skirt is integrally formed with the cover. The base and the cover may comprise two discrete components.

The cover, base, inner skirt and/or outer skirt of the oven of any aspect of the present invention are preferably formed of a polymeric material, more preferably a reinforced polymeric material, most preferably fibre-glass.

The cover and outer skirt of the oven of any aspect of the present invention may form at least part of the outer surface of the oven. The outer skirt and cover may substantially encapsulate the inner skirt and base.

Advantageously, integrally forming the skirt and base and/or cover further simplifies the manufacture process and provides improved strength without requiring further connecting elements.

The cover of the oven of any aspect of the present invention may comprise a liner. Suitably, the liner is attached to, preferably directly attached to, the inner face of the cover, more preferably over the inner face of the cover arranged in the cooking chamber. The lining is preferably an insulating and/or heat resistant lining. Suitably, the lining is a multi-layered lining and may comprise an insulation layer and a heat resistant layer. The insulation layer may be formed of ceramic, such as ceramic fibre. Preferably, the insulation layer has a density of between 80 and 170 kg/m$^2$, such as between 90 and 160 kg/m$^2$ or between 100 and 150 kg/m$^2$ or between 110 and 140 kg/m$^2$, for instance 120 and 135 kg/m$^2$. Suitably, the insulation layer can withstand temperatures of between 900 and 1600° C., such as between 1000 and 1500° C., or between 1100 and 1400° C., such as between 1200 and 1300° C. The insulation layer may be a ceramic fibre insulation blanket. For example VITCAS ceramic blanket. The heat resistant layer may be formed of a course heat resistant material, such as crushed firebrick cement, and/or a fine heat resistant material such as fine screed.

The cover of the oven of any aspect of the present invention may comprise a plurality of projections extending into the liner such as to attach the liner to the cover. The liner may comprise a binding layer and preferably the projections are attached at a first end to the cover and at a second end to the binding layer. Suitably, the binding layer is an intermediate layer in the liner, preferably arranged between an insulating layer proximate to the cover and a heat resistant layer distal to the cover. The binding layer may be attached to a second end of the projections and also to the heat resistant layer. In such a manner, preferably the binding layer is operable to attach the liner to the cover. The binder layer may comprise a plurality of apertures, suitably the binder layer comprises a mesh, preferably a metal mesh. Advantageously, the liner attachment system of the present invention provides an effective method of fixing the lining to the cover whilst also fixing the heat resistant layer to the insulation layer.

The base of the oven of any aspect of the present invention may comprise an insulation layer arranged between the cooking surface and the base.

The mouth of any aspect of the oven of the present invention may comprise a lip arranged on the upper edge of the mouth, the preferably lip extending outwardly from side face of the oven.

According to a further aspect of the present invention there is provided a portable oven, suitably a wood-fired oven, comprising:

a cooking surface a housing arranged over the cooking surface such as to provide a partially enclosed cooking chamber with the cooking surface;

wherein the oven comprises a side wall having a mouth in the form of an aperture operable to permit the passage of foodstuffs into and out of the cooking chamber of the oven;

wherein the mouth comprises a lip arranged on the upper edge of the mouth, and wherein the lip extends outwardly from the side wall of the oven.

The lip of the oven of any aspect of the present invention may extend substantially perpendicularly outwardly from the side wall of the oven. Preferably, the lip is arched. The lip may be formed of a more heat resistant material than the cover of the oven. Preferably the lip is formed of metal. More preferably, the lip is integrally formed with the mouth plate.

The lip may have a depth of up to 10 cm, such as 7 cm, 5 cm or 3 cm. The lip may have a depth that is significantly greater than its height. For instance the lip may have a depth to height ratio of between 100:1 and 2:1, such as between 75:1 and 3:1, or between 50:1 and 4:1, or between 30:1 and 5:1. Preferably, the depth of the lip is tapered, suitably the depth of the lip reduces from a largest depth at the portion of the lip arranged highest on the side face of the oven to smaller depths as the lip extends lower down the side face of the oven, suitably to a smallest depth at the portion of the lip lowest on the oven. Preferably, the lip has a substantially constant height.

The oven of any aspect of the present invention is preferably a wood-fired oven, such that the oven burns wood as the fuel source. More preferably, the oven is a black-type wood-fired oven, such that the wood fuel is burnt in the cooking chamber. As such, preferably the oven of the present invention is not a white-type oven, namely an oven that is heated by heat transfer from a separate combustion chamber and flue-gas path. Preferably the oven does not comprise electric or gas heating members.

The oven of the present invention is portable. The oven of any aspect of the present invention may be portable such that an average human adult male is able to lift and carry the oven independently without further assistance. The oven may have a weight of up to 40 kg, such as up to 35 kg, up to 30 kg or up to 25 kg or 20 kg. Suitably, the oven has a depth from the mouth of the oven to the opposing rear wall of up to 150 cm, such as up to 100 cm, up to 80 cm or up to 70 cm. The oven may have a width of up to 80 cm, such as up to 60 cm or up to 50 cm. The oven may have a height of up to 60 cm, such as up to 50 cm, or up 40 cm or up to 30 cm.

According to a further aspect of the present invention there is provided a method for producing a portable oven, preferably a portable oven according to any aspect of the present invention, comprising the steps of:

a. optionally attaching an insulation layer to a base;
b. attaching a cooking surface to a base or insulation layer, if present, the base comprising a skirt operable to raise the cooking surface from the bottom edge of the oven;
c. attaching a liner to a cover, the cover comprising a skirt;
d. arranging the cover over the base such that the skirt of the base and the skirt of the cover are abutting and the cooking surface and cover define a partially enclosed cooking chamber having a mouth;
e. optionally attaching, suitably fixedly attaching, the skirt of the base and the skirt of the cover together;
f. optionally, attaching a lip to the mouth of the oven, suitably attaching a mouth plate to the cover, and optionally to one or more of the skirts, wherein the mouth plate comprises a lip;
g. optionally removing a portion of the skirt to form one or more handles.

wherein steps a., b., c., f and g may be carried out in any suitable order.

All of the features contained herein may be combined with any of the above aspects in any combination.

BRIEF DESCRIPTION OF DRAWINGS

For a better understanding of the invention, and to show how embodiments of the same may be carried into effect, reference will now be made, by way of example, to the following figures.

DETAILED DESCRIPTION OF THE INVENTION

FIGS. 1 to 6 show a wood-fired oven 102 according to the present invention. Oven 102 is formed of cooking surface 106 enclosed within a housing formed of base 120 and cover 104.

Base 120 contains horizontally orientated planar platform 124. Extending downwardly around all of the peripheral edge of platform 124 is skirt 108*b*. Integrally formed platform 124 and skirt 108*b* are constructed from fibre-glass. Attached to the upper face of platform 124 with silicone sealant, and co-terminal with platform 124, is insulation board 122. Attached to the upper face of board 122 with fire proof tile adhesive, and co-terminal with board 122, is cooking surface 106. Cooking surface 106 is formed of a single integrally formed refractory ceramic tile. Base 120, fire-proof refractory insulation board 122 and cooking surface 106 collectively form the base section of oven 102. The total weight of the base section of oven 102 is around 10 kg.

Cover 104 is formed of domed body 112*a*; hemi-cylindrical head 112*b*, skirt 108*a*, lining 118 and planar mouth plate 114. Head 112*b* is integrally formed with, and extends from one side of, body 112*a* such that body 112*a* and head 112*b* collectively form a curved upper face across the top of oven 102. Skirt 108*a* is integrally formed with body 112*a* and head 112*b* and extends downwardly from the bottom of body 112*a* and head 112*b*. Body 112*a*, head 112*b* and skirt 108*a* are made of fibre glass and plate 114 is constructed from stainless steel.

Lining 118 extends over the inner face of body 112a and head 112b and is formed of insulation, binding, and heat resistant layers (not shown). Lining 118 terminates at the start of skirt 108a. The insulation layer of lining 118 extends over and abuts the inner face of body 112a and head 112b. A binding layer formed of galvanised wire mesh extends over and abuts the inner face of the insulation layer and a heat resistant layer of crushed firebrick cement extends over and around the wire mesh of the binding layer. The heat resistant layer also includes a layer of fine screed extending over the inner face of the layer of firebrick cement. To secure lining 118 to the inner face of body 112a and head 112b a plurality of deformable spikes (not shown) are attached to the inner face of body 112a and head 112b. The spikes extend through the insulation layer and are folded over the mesh to secure the insulation layer to the wire mesh of the binding layer. The presence of the heat resistant layer over and around the mesh further assists in securing the spikes to the mesh. In this manner, a single binding layer enables the attachment of an insulation layer to fibre-glass cover 104 and the attachment of a heat resistant layer to an insulation layer.

The base section of oven 102 is arranged in and fixedly attached to cover 104 such the outer face of skirt 108b extends parallel to, and abuts, the inner face of skirt 108a and the bottom edge of skirt 108b is co-terminal with the bottom edge of skirt 108a. In this configuration body 112a and head 112b extend upwardly from the peripheral edge of cooking surface 106 around substantially all of the peripheral edge except for the front peripheral edge of cooking surface 106. Skirt 108a extends downwardly from the peripheral edge of cooking surface 106 around substantially all of the peripheral edge except for the front peripheral edge of cooking surface 106. In this configuration, cooking surface 106 is raised from the bottom edge of oven 102 providing an open-bottomed cavity on the underside of oven 102 delineated by the bottom face of platform 124 and by the inner face of skirt 108b. In each of skirts 108a and 108b are opposed cut-away portions providing a restricted airflow channel and handles 110a and 110b.

Plate 114 is fixedly attached to a side face of oven 102 along a flange (not shown) extending from head 112b and also to the front face of skirt 108b. Plate 114 has hemispherical mouth 116 and is attached to cover 104 and base 120 such that the lower linear edge of mouth 116 is flush with the upper face of cooking surface 106. The arched upper edge of mouth 116 extends upwardly from the lower linear edge of mouth 116. In oven 102 the upper face of cooking surface 106 and the inner faces of liner 118 and plate 114 delineate a cooking chamber which chamber is fully enclosed apart from mouth 116.

In use, oven 102 is carried from a storage position using handles 110a,b and placed on the intended support surface for use, such as a work top or table. When oven 102 is in the desired position, wood that has been inserted into the cooking chamber of oven 102 via mouth 116 is ignited and further wood added until the desired temperature is reached inside the cooking chamber. When the desired temperature is reached any remaining wood and residues thereof can be pushed toward the peripheral edges of cooking surface 106 to allow foodstuffs, such as uncooked pizza, to be inserted via mouth 116 and arranged on cooking surface 106. When cooked, the foodstuff is removed from oven 102 via mouth 116. Once oven 102 has cooled sufficiently it can be returned to a storage position by carrying with handles 110a,b.

Figure 1:
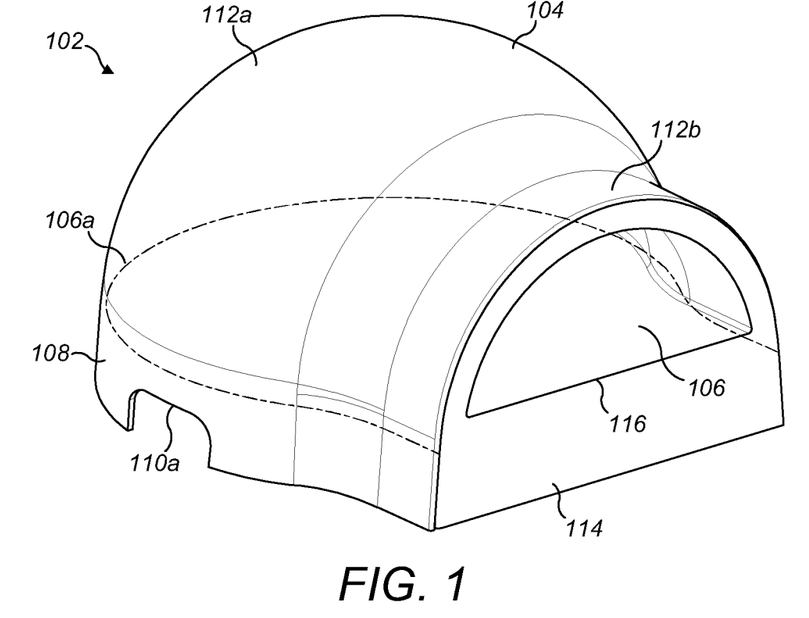
FIG. 1 shows a perspective view of a first embodiment of an oven according to the present invention.
Figure 2:
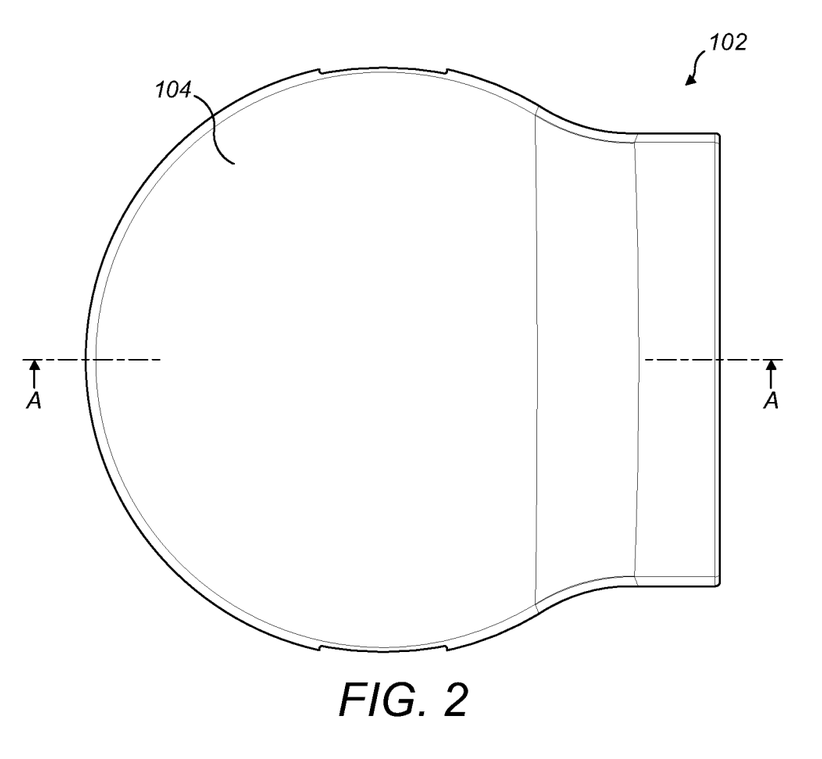
FIG. 2 shows a top view of the oven of FIG. 1.
Figure 3:
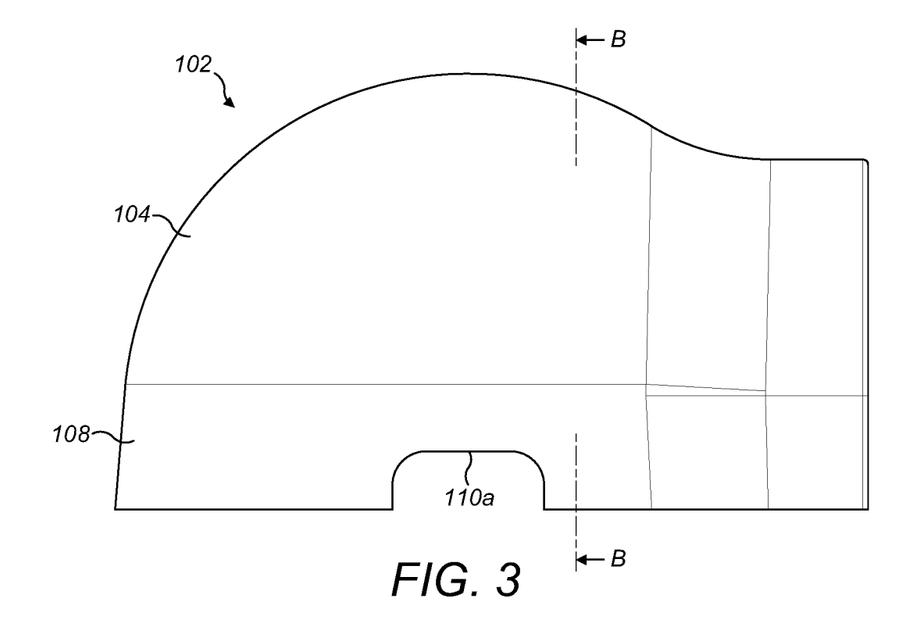
FIG. 3 shows a side view of the oven of FIG. 1.
Figure 4:
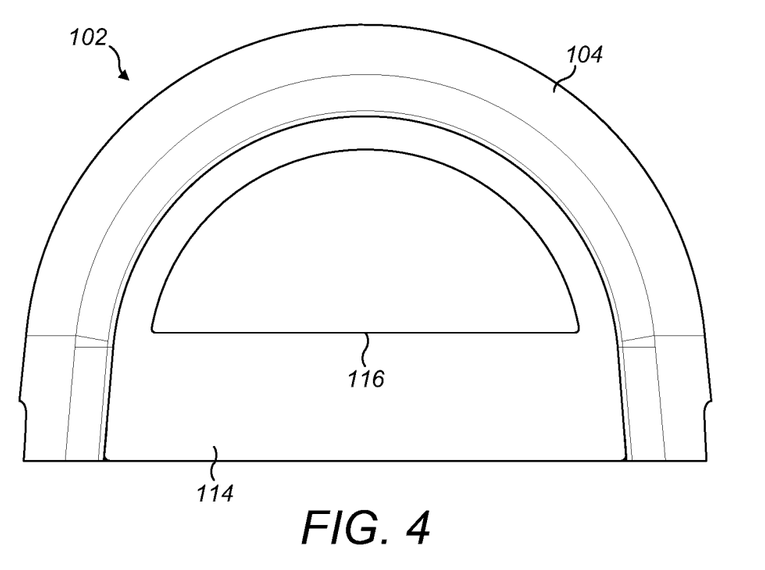
FIG. 4 shows a front view of the oven of FIG. 1.
Figure 5:
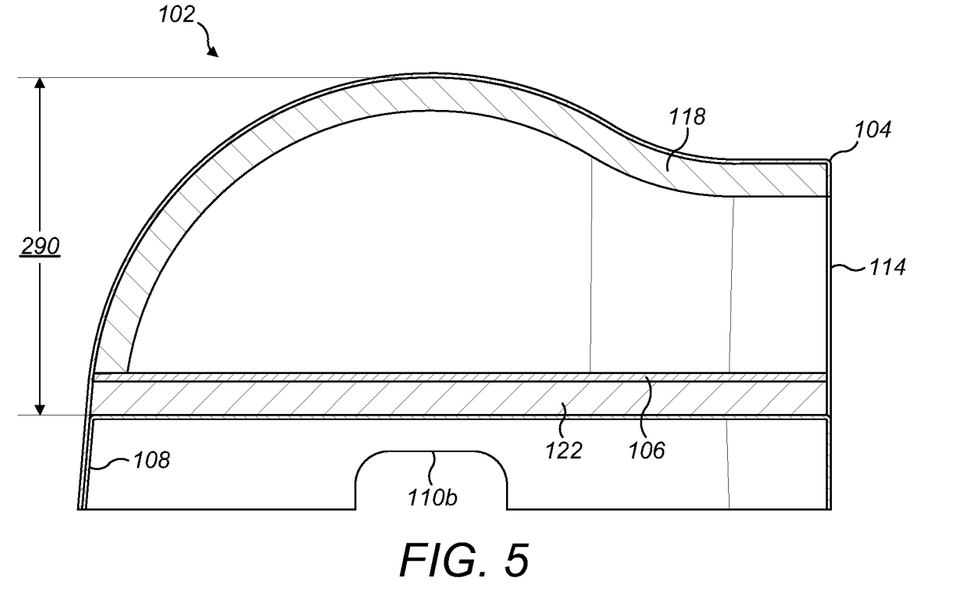
FIG. 5 shows a side sectional view along line A-A of the oven of FIG. 1.
Figure 6:
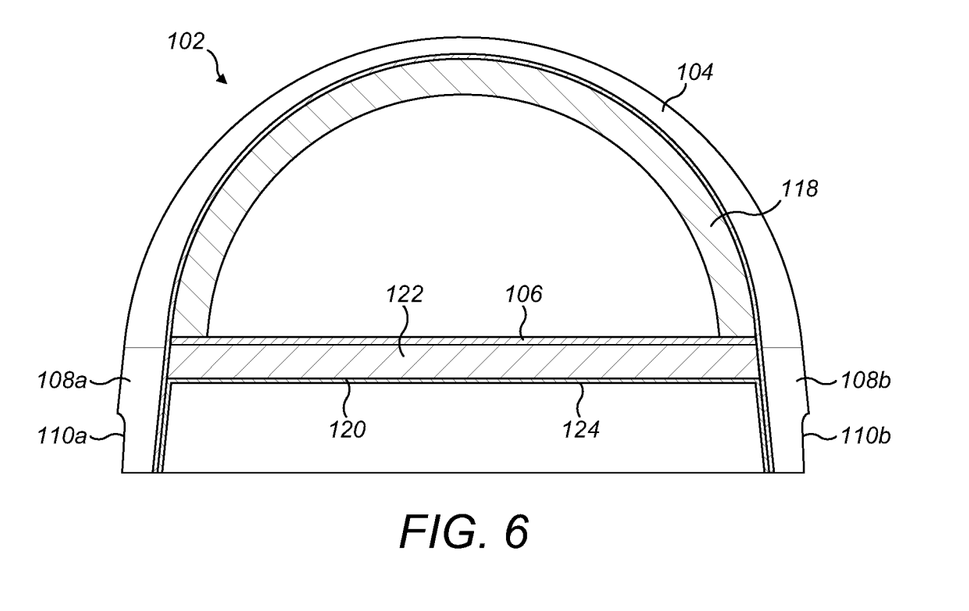
FIG. 6 shows a front sectional view along line B-B of the oven of FIG. 1.
Figure 7:
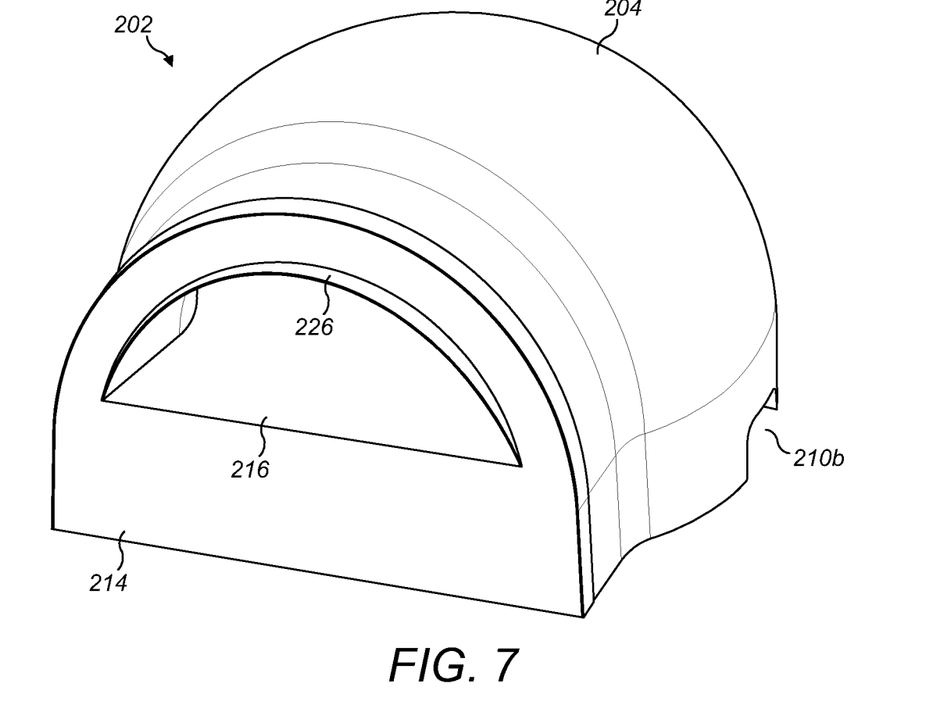
FIG. 7 shows a perspective view of a second embodiment of an oven according to the present invention.
Figure 8:
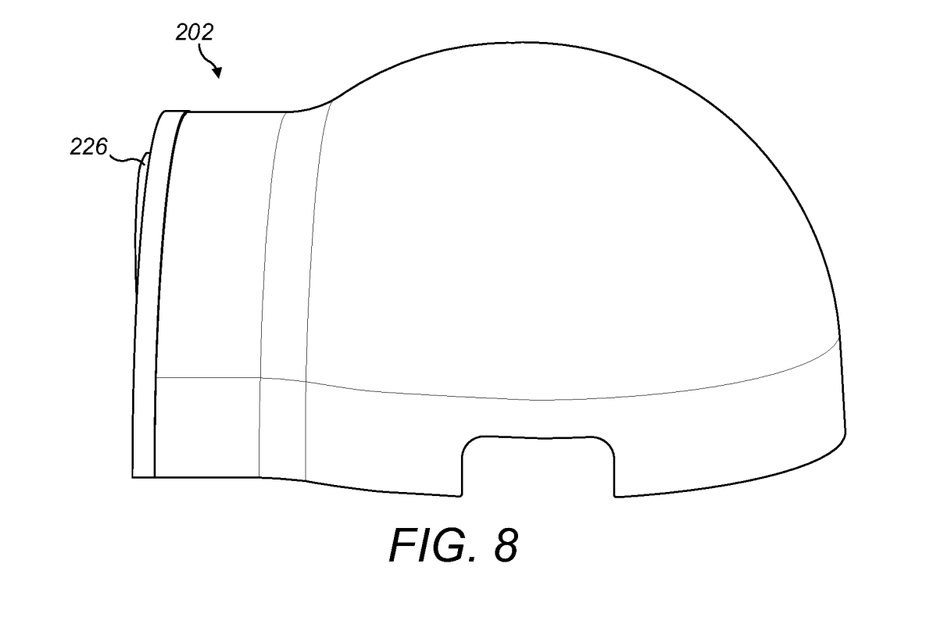
FIG. 8 shows a side view of the oven of FIG. 7.
Figure 9:
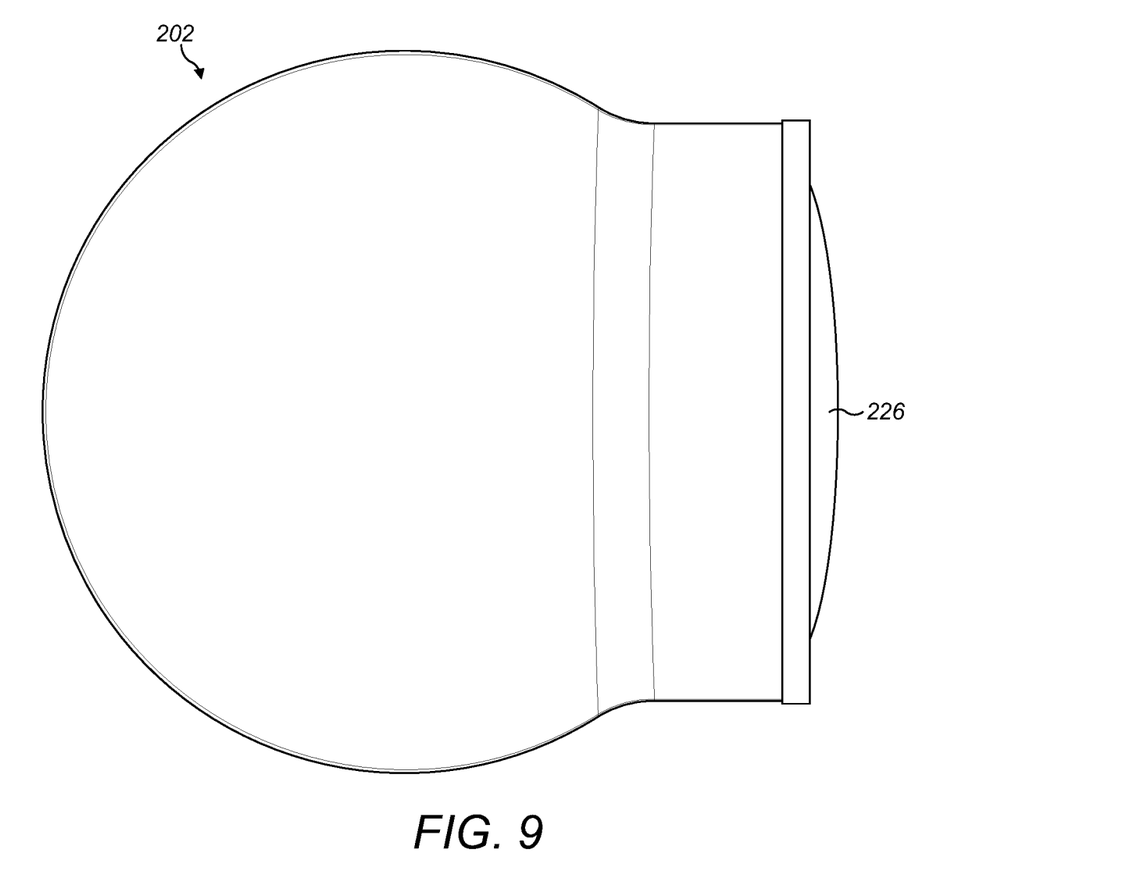
FIG. 9 shows a top view of the oven of FIG. 7.

FIGS. 7 to 9 show an oven 202 according to a second embodiment of the first present invention. Oven 202 is the same as oven 102 except that oven 202 additionally has arched lip 226 extending perpendicularly outwardly from plate 214 and the side face of oven 202. Metal lip 226 is integrally formed with plate 214 and extends along the upper edge of mouth 216. Lip 226 has a depth that is significantly greater than its height. The depth of lip 226 is greatest at the apex of arched lip 226 and tapers equally on either side to a smallest depth at the ends of lip 226.

In use, smokes is emitted from the cooking chamber of oven 202 out of aperture 216 and lip 226 directs the smoke such as to reduce the surface area of the outer faces of oven 202 that contacts significant amounts of the emitted smoke compared to oven 102. Furthermore, the majority of the surface area that is contacted with significant amounts of smoke faces downwardly such that the outer face of oven 202 that is contacted with significant amounts of smoke is not readily viewable during use.

Further advantageously, the provision of a skirt in combination with the limited ventilation and smoke guidance of oven 202 results in a portable oven that reduces damage to the support surface and the oven whilst providing improved heat retention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A portable oven, suitably a wood-fired oven, comprising:
   a housing;
   a cooking surface arranged within the housing;
   wherein the housing comprises a cover extending over the cooking surface that forms a partially enclosed cooking chamber with the cooking surface and a skirt extending below the cooking surface such as to raise the cooking surface from a bottom edge of the oven, and wherein the housing further comprises a base for supporting the cooking surface wherein the skirt delineates side walls of a cavity extending beneath the cooking surface, and is operable to restrict fluid communication between the external atmosphere and the cavity arranged underneath the cooking surface,
   wherein the skirt comprises an inner skirt attached to the base and an outer skirt attached to the cover, wherein the skirt comprises at least two substantially opposed cut-away portions on opposite sides of the cooking surface operable to be used as handles, wherein the cut-away portions extend through the inner skirt and the outer skirt to allow for fluid communication between the external atmosphere and the cavity arranged underneath the cooking surface, and wherein there is no direct fluid communication between the cooking chamber and the cavity arranged underneath the cooking surface.

2. The oven according to claim 1, wherein between 30 and 100% of the surface area of the skirt is closed such as to block fluid communication between the external atmosphere and the cavity arranged underneath the cooking surface.

3. The oven according to claim 1, wherein the inner skirt is operable to support the weight of the base and/or the outer skirt is operable to support the weight of the cover.

4. The oven according to claim 1, wherein the cover, base, inner skirt and/or outer skirt of the oven are formed of a polymeric material.

5. The oven according to claim 1, wherein the cover comprises a liner.

6. The oven according to claim 1, wherein the cover comprises a liner, and wherein the liner comprises a binding layer.

7. The oven according to claim 1, wherein the oven comprises a mouth in the form of an aperture operable to permit the passage of foodstuffs into and out of the cooking chamber of the oven, the mouth of the oven comprising a mouth plate having an aperture, aligned with the aperture of the oven, operable to permit the passage of foodstuffs into and out of the cooking chamber of the oven.

8. The oven according to claim 1, wherein a mouth of the oven is operable to provide the only means for fluid communication between the cooking chamber and the external atmosphere.

9. The oven according to claim 1, further comprising a cover plate coupled to a side face of the oven, the cover plate comprising a mouth, wherein the mouth comprises a lip configured to extend outward perpendicular to the cover plate and arranged on the upper edge of the mouth, the lip being configured to direct smoke emitted from the mouth to reduce a surface area of contact of the smoke with outer faces of the oven.

10. The oven according to claim 9, wherein the lip comprises a depth and a height, wherein the lip comprises an arch, and wherein the depth of the lip is greatest at an apex of the arch.

11. The oven according to claim 9, wherein the lip comprises a depth and a height, wherein the depth is greater than the height.

12. The oven according to claim 1, further comprising an insulation board, wherein the cooking surface is attached to an upper face of the insulation board.

13. The oven according to claim 12, further comprising fireproof tile adhesive configured to attach the cooking surface to the upper face of the insulation board.

14. The oven according to claim 1, wherein the cooking surface comprises a single refractory ceramic tile.

15. The oven according to claim 1, wherein the cover comprises a domed body integrated with a hemi-cylindrical head that protrudes outward from the domed body.

16. The oven according to claim 15, further comprising a mouth plate that includes a hemi-spherical mouth aperture, the mouth plate being coupled to the hemi-cylindrical head.

17. The oven according to claim 1, wherein the cooking surface consists of a single refractory ceramic tile.

* * * * *